(12) United States Patent
Ludwig et al.

(10) Patent No.: US 8,526,960 B2
(45) Date of Patent: Sep. 3, 2013

(54) NODE B-CONTROL-PROXY

(75) Inventors: Reiner Ludwig, Hürtgenwald (DE); Stefan Parkvall, Stockholm (SE); Pontus Wallentin, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1137 days.

(21) Appl. No.: 12/093,304

(22) PCT Filed: Nov. 10, 2005

(86) PCT No.: PCT/EP2005/055883
§ 371 (c)(1),
(2), (4) Date: May 9, 2008

(87) PCT Pub. No.: WO2007/054127
PCT Pub. Date: May 18, 2007

(65) Prior Publication Data
US 2008/0287136 A1    Nov. 20, 2008

(51) Int. Cl.
*H04W 40/00*    (2009.01)
(52) U.S. Cl.
USPC ............................ 455/446; 709/208; 709/209
(58) Field of Classification Search
USPC .............. 455/446, 423; 370/466; 714/750; 709/208–209
See application file for complete search history.

(56) References Cited

U.S. PATENT DOCUMENTS

| | | | |
|---|---|---|---|
| 6,925,286 B1 | 8/2005 | Kraiem et al. | |
| 2002/0090914 A1* | 7/2002 | Kang et al. | 455/41 |
| 2003/0212820 A1* | 11/2003 | deCarmo | 709/238 |
| 2004/0127259 A1 | 7/2004 | Matsunaga | |
| 2008/0259961 A1* | 10/2008 | Wiemann et al. | 370/492 |
| 2009/0003378 A1* | 1/2009 | Sachs | 370/466 |
| 2009/0082007 A1* | 3/2009 | De Benedittis et al. | 455/423 |
| 2010/0180172 A1* | 7/2010 | Weimann et al. | 714/750 |

FOREIGN PATENT DOCUMENTS

| | | |
|---|---|---|
| EP | 1223715 A | 7/2002 |
| JP | 2005-142848 A | 6/2005 |
| WO | WO 03/003785 A1 | 1/2003 |

OTHER PUBLICATIONS

Wiemann H et al: "A Novel Multi-Hop ARQ Concept" May 2005 Vehicular Technology Conference 2005. VTC 2005-Spring. 2005 IEEE 61st Stockholm, Sweden May 30-01, 2005 Piscataway, NJ , USA, IEEE pp. 3097-3103 ; XP002398436 ISBN: 0-7803-8887-9.

* cited by examiner

*Primary Examiner* — Jinsong Hu
*Assistant Examiner* — Nathan Taylor

(57) ABSTRACT

The present invention relates to a first node and a second node in a mobile telecommunication network. The network comprises a first node, a second node and a third node, wherein the first node is connectable to the second node and the second node is connectable to the first node and to the third node and the third node is connectable to the second node. A system function is realized by the execution of a master-process implemented in the first node and a slave-process implemented in the third node, wherein the execution of the master-process realizes a control function associated with the system function. The master-process of the first node is adapted to temporarily delegate the responsibility to realize the control function to a master-proxy-process implemented in the second node and the master-proxy-process implemented in the second node is adapted to take over the responsibility to realize the control function from the master-process of the first node.

24 Claims, 3 Drawing Sheets

1. Master-Proxy "Listens" and Maintains Soft-State about Control Process

2. Master-Process Delegates Control Responsibility to Master-Proxy

NODE B-CONTROL-PROXY

FIELD OF THE INVENTION

The present invention relates to a mobile telecommunication network. In particular, the present invention relates to delegation of control responsibility from a first node to a second node in the network.

BACKGROUND OF THE INVENTION

The present invention relates to arrangements in a radio access network of a mobile telecommunication network. An example of such a mobile telecommunication network wherein the present invention may be implemented is a Universal Mobile Telecommunication System (UMTS) Network and the radio access network of UMTS is denoted UMTS terrestrial radio access network (UTRAN). The UTRAN is illustrated in FIG. 1 and comprises at least one Radio Network System 100 connected to the Core Network (CN) 200. The CN is connectable to other networks such as the Internet, other mobile networks e.g. GSM systems and fixed telephony networks. The RNS 100 comprises at least one Radio Network Controller 110. Furthermore, the respective RNC 110 controls a plurality of Node-Bs 120,130 that are connected to the RNC by means of the Iub interface 140. Each Node-B, also referred to as base station, covers one or more cells and is arranged to serve the User Equipment (UE) 300 within said cell. Finally, the UE 300, also referred to as mobile terminal, is connected to one or more Node-Bs over the Wideband Code Division Multiple Access (WCDMA) based radio interface 150. The UMTS network illustrated in FIG. 1 is also denoted WCDMA network.

According to the current state-of-the-art, e.g. as defined by the 3GPP standards, a certain function in the UE is controlled by a control function in the RNC. Said certain function is implemented by a process which in this description is denoted as slave-process and the control function is implemented by a process which in this description is denoted master-process. In this sense, the master-process controls the slave-process. The master- and the slave-process are components of a distributed process. The execution of such a distributed process realizes a system function. Examples of such a system function are power control and Automatic Repeat reQuest (ARQ). During execution, a master-process and a slave-process are said to be engaged in a control loop, where the master-process sends commands to the slave-process where the commands are potentially based on feedback sent from the slave-process to the master-process. This is illustrated in FIG. 2. FIG. 2 shows schematically the slave-process implemented in a UE, wherein the slave-process communicates with the master-process in an RNC. The master-process sends control commands to the slave-process and the slave-process responds with feedback, e.g. measurement reports. In addition, another example of a control-loop is when a certain function in a Node-B is also controlled from an RNC but based on feedback from the UEs connected to that Node-B.

A problem that is common to both types of control-loops is that the delay in the control-loop may cause imprecise execution of the slave- and/or master-process that in turn may result in reduced performance of the corresponding system function or other functions that directly or indirectly depend on that system function.

For certain system functions such as reliable link-layer transmission based on ARQ, mobility functionality and channel re-configurations, the Node-B has more accurate/timely information than the RNC. Thus, for such system functions the Node-B is often in a better position than the RNC to execute the corresponding master-process.

A simple but inadequate solution would be to implement the master-process in the Node-B instead of the RNC. That would however require additional solutions to handle so-called intra-RNC handovers, where a UE re-connects to a new Node-B that is connected to the same RNC as the old Node-B.

Fast channel setup is considered in the PCT application SE2004000721. However, the method in SE2004000721 only discusses a method for reducing the transition from the RRC states CELL_FACH to CELL_DCH in a WCDMA system by providing the Node-B with temporary resources to be used while waiting for the final resource assignment from the RNC. (RRC states are further described in 3G TS 25.331) however in this case, the control is not completely transferred to the Node-B. The RNC is always involved in the decision and the Node-B only assigns temporary resources to the UE while waiting for the RNC decision.

SUMMARY

Thus, an object of the present invention is to reduce delays in the control-loop between a slave-process implemented in a UE and a corresponding master-process implemented in an RNC that does not require any context transfer between Node-Bs during intra-RNC handovers.

The object is achieved by the arrangements of claims 1 and 2 and by the method of claim Preferred embodiments are defined by the dependent claims.

The first node according to the present invention wherein the master-process of the first node is adapted to temporarily delegate the responsibility to realize the control function to a master-proxy-process implemented in the second node, makes it possible to reduce delays in the control-loop between a slave-process implemented in a UE and a corresponding master-process implemented in an RNC that does not require any context transfer between Node-Bs during intra-RNC handovers.

The second node according to the present invention wherein the master-proxy-process implemented in the second node is adapted to take over the responsibility to realize the control function from the master-process of the first node, makes it possible to reduce delays in the control-loop between a slave-process implemented in a UE and a corresponding master-process implemented in an RNC that does not require any context transfer between Node-Bs during intra-RNC handovers.

The first method according to the present invention comprising the step of temporarily delegating the responsibility to realize the control function to a master-proxy-process implemented in the second node, makes it possible to reduce delays in the control-loop between a slave-process implemented in a UE and a corresponding master-process implemented in an RNC that does not require any context transfer between Node-Bs during intra-RNC handovers.

The second method according to the present invention comprising the step of taking over the responsibility to realize the control function from the master-process of the first node, makes it possible to reduce delays in the control-loop between a slave-process implemented in a UE and a corresponding master-process implemented in an RNC that does not require any context transfer between Node-Bs during intra-RNC handovers.

DETAILED DESCRIPTION OF THE PRESENT INVENTION

Figure 1:
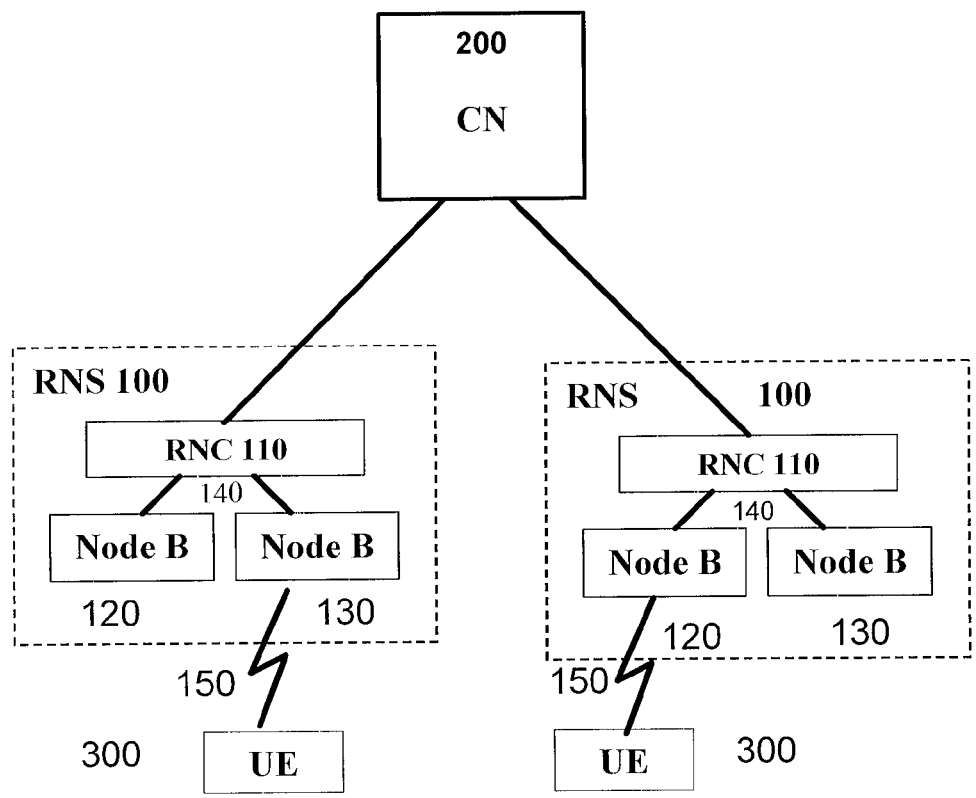
FIG. 1 illustrates a mobile telecommunication network wherein the present invention may be implemented.
Figure 2:
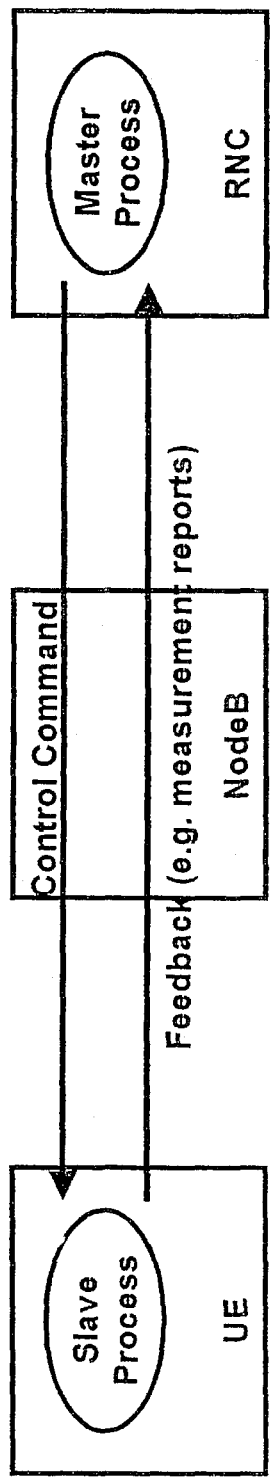
FIG. 2 illustrates the interaction of a master-process and a slave-process according to prior art.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention is achieved by a mobile telecommunication network comprising a first node connectable to a second node, the second node connectable to the first node and to a third node and the third node connectable to the second node. The first node provides a control function associated to a system function, e.g. mobility, re-transmissions and channel re-configuration, wherein this control function is implemented by a master-process. The third node provides a function also associated to that system function, wherein this function is implemented by a slave-process. The second node provides the same control function as provided by the first node also associated to that system function, wherein this control function is implemented by a master-proxy-process. The master-process in the first node is adapted to temporarily delegate the responsibility to realize the control function to the master-proxy-process in the second node, i.e., either the execution of the master-process or the execution of the master-proxy-process realizes the control function. Accordingly, the master-proxy-process implemented in the second node is adapted to take over the responsibility to realize the control function from the master-process of the first node. If the master-proxy-process fails, e.g. due to a handover to a new Node-B, the responsibility automatically falls back to the master-process.

It should be noted that the term proxy used in this description is used to denote an entity capable of listening to the master-process and building up own states. A difference between proxies of prior art and the proxy according to the present invention is that the proxy of the present invention is able to function autonomously, but only after it has been delegated the responsibility from the master-process. Thus, the proxy of the present invention is e.g. able to issue new commands to e.g. the UE.

In the embodiments described below, it is assumed that the first node is an RNC, that the second node is a Node-B and that the third node is a UE. It should however be noted that it is conceivable that a master-process is implemented in the UE controlling a slave-process in a Node-B in case that relay nodes are involved in the transmission between the UE and a Node-B. Relay nodes are further described below. Another example would be a master-proxy-process implemented in a Node-B acting on behalf of a master-process implemented in a connected UE controlling (if control has been delegated from the master-process) a slave-process implemented in an RNC. Thus, the embodiments of the present invention described below are not limited to the scenario when the RNC is the first node, the Node-B is the second node and the UE is the third node.

Figure 3:
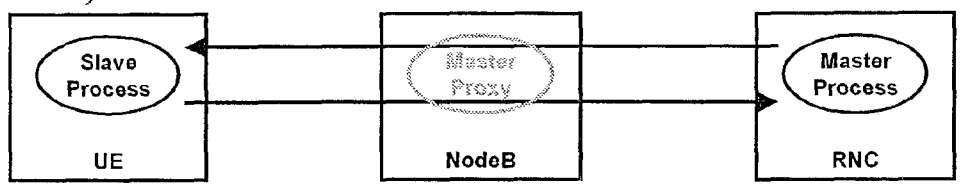
FIG. 3 illustrates an embodiment of the present invention.
Figure 3:
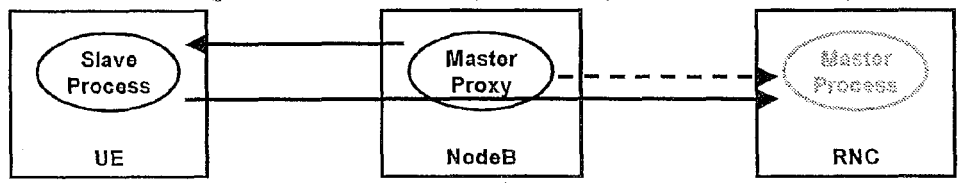

One preferred embodiment of the present invention is to explicitly design the master-proxy-process to only maintain soft-state. The concept of soft-state is well known in networking literature. It denotes state that is maintained between communicating end-points, where the state is not critical for the functioning of the communication. Such soft-state is maintained by what one could call a man-in-the middle. Such a man-in-the middle is commonly used to enhance the performance of the communication between end-points. The soft-state maintained by a man-in-the middle may at any point in time be lost without any risk of loosing the communication between the end-points. Likewise, a man-in-the middle, e.g. a Node-B, may at any point in time build up soft-state by "listening" to the communication between the relevant end-points. This is illustrated in FIG. 3.

Contrary to soft-state is so-called hard state. Hard state is commonly maintained at the end-points and if lost will cause a failure of the communication between the end-points.

According to another preferred embodiment, the master-proxy-process does not acquire all the necessary states of the master-process by its own. Therefore, the master-process and the master-proxy-process have to perform some kind of synchronization, e.g., to handshake that both processes maintain identical states. The master process may send the current states in a separate communication to the master-proxy-process and the master-proxy-process may acknowledge that it has the current states. This procedure may also be performed in the other direction, i.e. when the master-process resumes responsibility from the master-proxy-process. It should also be noted that the synchronization may comprise all states or only one or a few of the current states.

According to a further embodiment, the master-process is adapted to delegate the control responsibility to the master-proxy-process, e.g. by sending an explicit command. Numerous triggers are however conceivable for this action, e.g., that the UE has remained rather stationary for a pre-defined time.

Moreover, the master-process comprises means for taking over the control responsibility from the master-proxy-process e.g. by sending an explicit command. Numerous triggers are however conceivable for this action, e.g., that the RNC anticipates a handover.

In order for the control-loop between the RNC and the UE to function correctly before and after the delegation of the control responsibility, the RNC maintains its states and the UE maintains its states associated with that communication. If the states of the UE are not maintained in the RNC, the master-proxy-process has to send the states to the RNC before the RNC resumes responsibility of the control function.

In a preferred embodiment, the master-proxy-process while having the control responsibility is adapted to send so-called heartbeat messages to the master-process to announce that it is still functioning, and hence that it still executing the control responsibility. The master-process is then able to use the absence of heartbeats for a certain time, e.g. controlled by a timer, to conclude that the master-proxy-process has failed. Triggered by this event, the master-process is then able to take over the control responsibility.

According to a further embodiment, the slave-process, the master-process and the master-proxy-process, are respectively, adapted to communicate via the RelayARQ protocol with the Data-Bus extension.

A more advanced scenario involves one or more Relay Nodes (RN) topologically connected in a sequence between the Node-B and the UE. Both the problem and the solution of the present invention applies to this scenario. In the scenario with RNs, the master-proxy-process may be implemented in an RN while the master-process is implemented in either the UE, the RNC, the Node-B, or another RN.

In the following sections, three examples of applying the invention to a WCDMA network as shown in FIG. 1 is given. In this context, examples are given wherein the master-process is located in the RNC while the slave-process is located in the UE. The use of WCDMA is for illustrative purposes only, the present invention is applicable to other cellular standards as well.

Example 1

A first example where the invention is applicable is intra-node B handovers or, in the general sense, management of the active set. If several cells are controlled by the same Node-B, there is no need to involve the RNC in cell changes. Thus, the master-process of the RNC may delegate the control to a master-proxy-process in the Node-B according to the present invention. Either existing measurement reports from the UE to the RNC may be intercepted by the master-proxy-process in the Node-B, or new measurement signaling terminated in the in the master-proxy-process in Node-B may be introduced. If the target cell is within the set of cells controlled by the Node-B, the corresponding procedures may be executed within the Node-B by the master-proxy-process. The Node-B is able to update the active set in the terminal (in case of soft handover) or switch the UE to a new cell (in case of hard handover). New downlink signalling may be needed and one possibility is to use the High Speed Downlink Shared Channel (HS-DSCH) for this as the Node-B already controls the scheduling of the HS-DSCH.

Example 2

A second example when the RNC may delegate control to the Node-B is when the UE uses a dedicated channel. Normally, because of macro-diversity between Node-Bs, the control is made above the macro-diversity point i.e. in the RNC. However, when no macro-diversity is applied, the Node-B—as opposed to the RNC—may by means of the master-proxy-process control all radio related aspects of the UE connection.

In the WCDMA context, this is accomplished by adding a new Radio Resource Control (RRC) state, called "CELL_S3G". A RRC state is defined by the radio resources available to the UE and on which level of the network that the UE is known. When the UE is in the CELL_S3G state, a master-proxy-process in the Node-B is adapted to control all radio related aspects of the UE connection. In other RRC states, such as CELL_DCH and URA_PCH, the corresponding control would be controlled by the master-process in the RNC. During transition between the CELL_S3G state and other RRC states, the control is transferred from the master-process in the RNC to the master-proxy-process of the Node-B and vice versa.

An example of control performed by the Node-B in the CELL_S3G state is transferring the UE between a high speed data transfer sub-state and a power-saving sub-state. Existing channels may be used in these sub-states, such as E-DCH/HS-DSCH in the high-speed data transfer sub-state and the PCH in the power saving sub-state. The master-proxy-process of the Node-B commands the UE to transfer between these sub-states, including allocating necessary resources. For this to work properly, the RNC and the Node-B must divide the WCDMA codes between each other. In one example, the RNC provides the Node-B with a certain portion of the code tree. The Node-B based control may either be performed in the Media Access (MAC) Layer or in the RRC layer.

Example 3

A third example is outer loop operation. Outer loop operation implies that the RNC monitors a quality indication, e.g. the frame error rate, of the data transmission and orders the Node-B or the UE to either decrease or increase the power depending on whether the quality indication is above or below a pre-defined threshold. In non-Soft handover, there is no reason to have the outer loop in the RNC, but according to the present invention it can reside in the master-proxy-process of the Node-B in order to achieve a faster reaction time. The RNC may still remain a "shadow" outer loop. When the UE enters inter-Node-B soft handover, the RNC outer loop would take over and override the Node-B outer loop and sending the SIR (=Signal-Interference-Ratio) target the way it is done today.

The present invention also relates to methods in a mobile telecommunication network. The network comprises a first node, a second node and a third node, wherein the first node is connectable to the second node and the second node is connectable to the first node and to the third node and the third node is connectable to the second node. A system function is realized by the execution of a master-process implemented in the first node and a slave-process implemented in the third node, and wherein the execution of the master-process realizes a control function associated with the system function. A method according to one aspect of the present invention comprises the step of temporarily delegating the responsibility to realize the control function to a master-proxy-process implemented in the second node.

A method according to another aspect of the present invention comprises the step of taking over the responsibility to realize the control function from the master-process of the first node.

The methods may be implemented by a computer program product. Such a computer program product may be directly loadable into a processing means in a computer and it comprises the software code means for performing the steps of the method.

The computer program product may be stored on a computer usable medium, comprising readable program for causing a processing means in a computer, to control the execution of the steps of the method.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A first node for use in a mobile telecommunication network that includes a second node configured to execute a master-proxy-process and a third node configured to execute a slave-process, wherein the first node is configured to execute a master-process, and wherein execution of the master-process and the slave-process realizes a system function associated with a mobility of the third node, and wherein the execution of the master-process realizes a control function associated with the system function, wherein the control function relates to management of an active set for the third node, characterized in that, while the master-process of the first node has responsibility for managing the active set, the first node is adapted to issue commands related to managing the active set to the third node through the second node and the first node is further adapted to temporarily delegate the responsibility for managing the active set to a master-proxy-process implemented in the second node, and wherein the master-process is adapted to receive heartbeat messages from the master-proxy-process while the master-proxy-process has responsibility for managing the active set in order to obtain information that the master-proxy-process is functioning.

2. A second node for use in a mobile telecommunication network that includes a first node configured to execute a master-process and a third node configured to execute a slave process, wherein execution of the master-process and the slave-process realizes a system function associated with a mobility of the third node, and wherein the execution of the master-process realizes a control function associated with the system function, wherein the control function relates to management of an active set of the third node, characterized in that, while the master-process of the first node has responsibility for managing the active set, the second node is configured to derive soft-state information associated with the system function based on communication between the first node and the third node that passes through the second node and, when the master-process of the first node delegates the responsibility for managing the active set to a master-proxy-process implemented in the second node, the second node is adapted to manage the active set by autonomously issuing new commands to the third node based on the derived soft-state information, and wherein the master-proxy-process is configured to send heartbeat messages to the master-process while having responsibility for managing the active set in order to indicate that the master-proxy-process is functioning.

3. The node according to claim 1, wherein the master-proxy-process is adapted to maintain soft-state.

4. The node according to claim 1, wherein the master-process and the master-proxy-process comprises means for performing a synchronization of at least one state.

5. The node according to claim 1, wherein the master-process comprises means for delegating the control of the control function to the master-proxy-process by sending an explicit command.

6. The node according to claim 1, wherein the master-process comprises means for resuming the control of the control function from the master-proxy-process.

7. The node according to claim 1, wherein the slave-process, master-process and the master-proxy-process, respectively, comprises means for communicating via RelayARQ protocol with a Data-Bus extension.

8. The node according to claim 1, wherein the first node is a Radio Network controller, RNC, and that the third node is a User Equipment, UE.

9. The node according to claim 1, wherein the second node is a relay node between a Node-B and the third node.

10. The node according to claim 1, wherein the third node is a Radio Network controller, RNC, and that the first node is a User Equipment, UE.

11. The node according to claim 10, wherein the second node is a relay node between a Node-B and the first node.

12. The node according to claim 1, wherein the second node is a Node-B.

13. A method of operating a first node in a mobile telecommunication network comprising the first node, a second node configured to execute a master-proxy-process and a third node configured to execute a slave-process, wherein execution of the master-process and the slave-process realizes a system function associated with a mobility of the third node, and wherein the execution of the master-process realizes a control function associated with the system function, wherein the control function relates to management of an active set for the third node, the method comprising:
  while the master-process of the first node has responsibility for managing the active set, issuing commands related to managing the active set from the first node to the third node through the second node;
  temporarily delegating the responsibility for managing the active set to a master-proxy-process implemented in the second node; and
  receiving heartbeat messages from the master-proxy-process while the master-proxy-process has the responsibility for managing the active set in order to get information that the master-proxy-process is functioning.

14. A method of operating a second node in a mobile telecommunication network comprising the second node, a first node configured to execute a master-process, and a third node configured to execute a slave-process, wherein execution of the master-process and the slave-process realizes a system function associated with a mobility of the third node, and wherein the execution of the master-process realizes a control function associated with the system function, wherein the control function relates to management of an active set for the third node, the method comprising:
  while the master-process of the first node has responsibility for managing the active set, deriving soft-state information associated with the system function at the second node based on communication between the first node and the third node that passes through the second node;
  when the master-process of the first node delegates the responsibility for managing the active set to a master-proxy-process implemented in the second node, managing the active set by autonomously issuing new commands to the third node based on the derived soft-state information; and
  sending heartbeat messages to the master-process while the master-proxy-process has the responsibility for managing the active set in order to indicate that the master-proxy-process is functioning.

15. The method according to claim 13, wherein the master-proxy-process is adapted to maintain soft-state.

16. The method according to claim 13, wherein the method comprises the further step of:
  performing a synchronization of at least one state before the delegation or the taking over step is performed.

17. The method according to claim 13, wherein the delegating step is performed by the step of:
  sending an explicit command.

18. The method according to claim 13, wherein the method comprises the further step of:
  resuming the control of the control function from the master-proxy-process.

19. The method according to claim 13, wherein the slave-process, master-process and the master-proxy-process, respectively, comprise means for communicating via RelayARQ protocol with a Data-Bus extension.

20. The method according to claim 13, wherein the first node is a Radio Network controller, RNC, and that the third node is a User Equipment, UE.

21. The method network according to claim 20, wherein the second node is a relay node between a Node-B and the third node.

22. The method according to claim 13, wherein the third node is a Radio Network controller, RNC, and that the first node is a User Equipment, UE.

23. The method according to claim 22, wherein the second node is a relay node between a Node-B and the first node.

24. The method according to claim 20, wherein the second node is a Node-B.

* * * * *